US012676718B2

(12) United States Patent
    Kim et al.

(10) Patent No.: US 12,676,718 B2
(45) Date of Patent: Jul. 7, 2026

(54) METHOD AND APPARATUS FOR CHANNEL STATE INFORMATION REPORT IN WIRELESS COMMUNICATION SYSTEM

(71) Applicant: LG ELECTRONICS INC., Seoul (KR)

(72) Inventors: Hyungtae Kim, Seoul (KR); Jiwon Kang, Seoul (KR); Kyuseok Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 500 days.

(21) Appl. No.: 18/185,911

(22) Filed: Mar. 17, 2023

(65) Prior Publication Data

US 2023/0353316 A1 Nov. 2, 2023

(30) Foreign Application Priority Data

Apr. 28, 2022 (KR) ........................ 10-2022-0053068

(51) Int. Cl.
*H04L 5/00* (2006.01)

(52) U.S. Cl.
CPC .......... *H04L 5/0051* (2013.01); *H04L 5/0078* (2013.01)

(58) Field of Classification Search
None
See application file for complete search history.

(56) References Cited

U.S. PATENT DOCUMENTS

| | | | | |
|---|---|---|---|---|
| 2020/0029274 A1* | 1/2020 | Cheng | ..................... | H04W 48/20 |
| 2021/0028823 A1* | 1/2021 | Park | ......................... | H04W 8/24 |
| 2021/0028843 A1* | 1/2021 | Zhou | ....................... | H04B 7/063 |
| 2021/0051622 A1* | 2/2021 | Manolakos | ........... | H04W 64/00 |
| 2022/0295297 A1* | 9/2022 | Li | ............................ | H04W 16/28 |
| 2022/0295498 A1* | 9/2022 | Zhu | ...................... | H04W 56/001 |
| 2022/0337300 A1* | 10/2022 | Yuk | ....................... | H04L 1/0028 |
| 2023/0189037 A1* | 6/2023 | Matsumura | ........... | H04W 24/10 370/252 |
| 2023/0262503 A1* | 8/2023 | Liu | ......................... | H04L 5/005 370/252 |

FOREIGN PATENT DOCUMENTS

| | | | | |
|---|---|---|---|---|
| WO | WO-2023010245 A1 * | 2/2023 | ........... | H04B 7/0456 |

* cited by examiner

*Primary Examiner* — Jamaal Henson
(74) *Attorney, Agent, or Firm* — LEE, HONG, DEGERMAN, KANG & WAIMEY

(57) ABSTRACT

A method and an apparatus for channel state information report (CSI report) in a wireless communication system are disclosed. A method performed by a terminal in a wireless communication system according to an embodiment of the present disclosure may comprise: receiving, from a network, configuration information related to N reporting settings and a plurality of CSI-RS resources, wherein the N is an integer greater than or equal to 1; receiving, from the network, triggering information indicating at least one reporting setting among the N reporting settings; and transmitting, to the network, a single CSI based on a plurality of time instances of the plurality of CSI-RS resources, in response to the triggering information. Here, the plurality of time instances may be related to the at least one reporting setting.

10 Claims, 9 Drawing Sheets

FIG.6

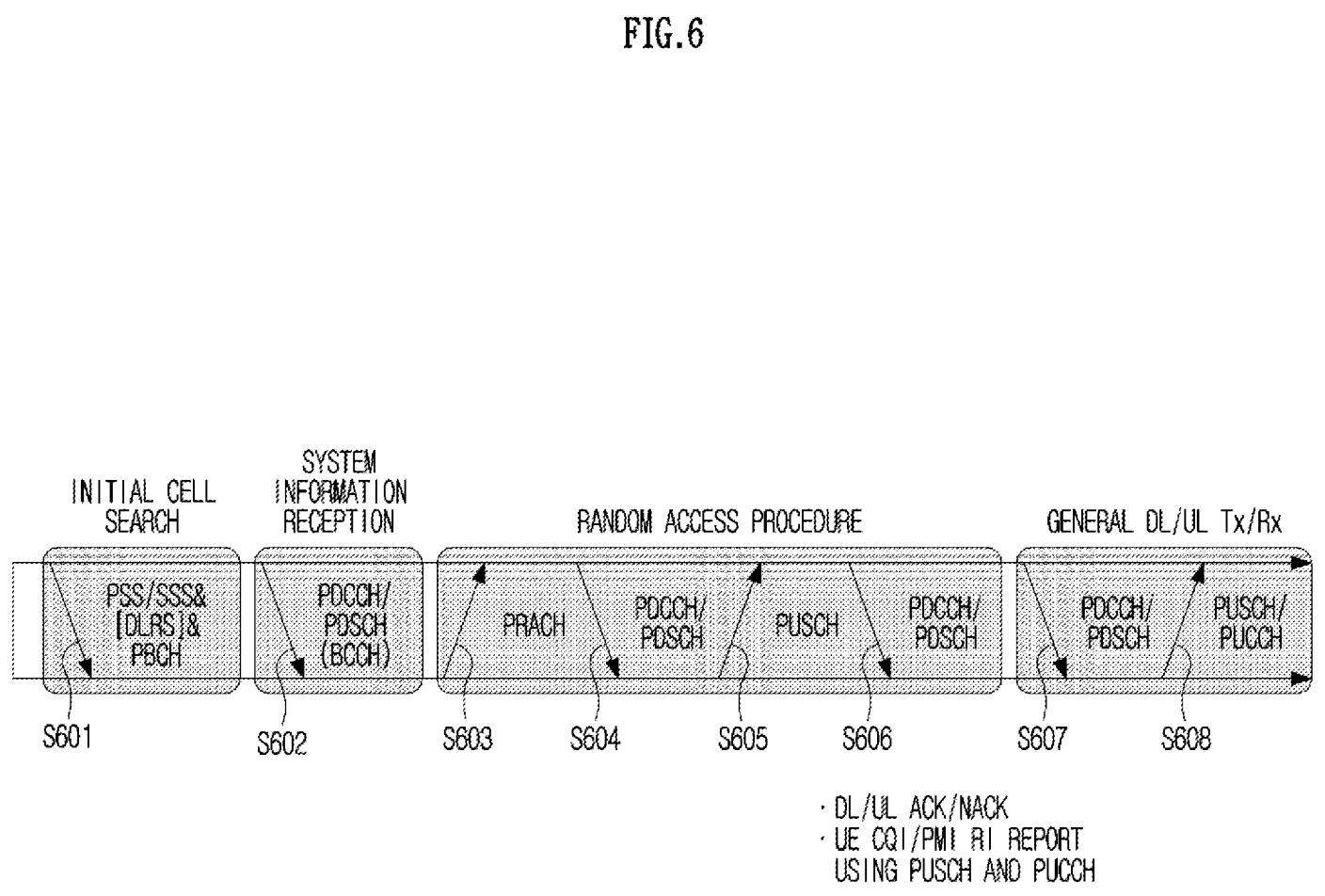

INITIAL CELL SEARCH

PSS/SSS& IDLRS/& PBCH

S601

SYSTEM INFORMATION RECEPTION

PDCCH/ PDSCH (BCCH)

S602

RANDOM ACCESS PROCEDURE

PRACH — S603

PDCCH/ PDSCH — S604

PUSCH — S605

PDCCH/ PDSCH — S606

GENERAL DL/UL Tx/Rx

PDCCH/ PDSCH — S607

PUSCH/ PUCCH — S608

· DL/UL ACK/NACK
· UE CQI/PMI RI REPORT USING PUSCH AND PUCCH

FIG.9

METHOD AND APPARATUS FOR CHANNEL STATE INFORMATION REPORT IN WIRELESS COMMUNICATION SYSTEM

CROSS-REFERENCE TO RELATED APPLICATIONS

Pursuant to 35 U.S.C. § 119(a), this application claims the benefit of earlier filing date and right of priority to Korean Patent Application No. 10-2022-0053068, filed on Apr. 28, 2022, the contents of which are all hereby incorporated by reference herein in their entireties.

TECHNICAL FIELD

The present disclosure relates to a wireless communication system, and more particularly, to a method and apparatus for performing channel state information report in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical object of the present disclosure is to provide a method and apparatus for performing channel state information report (CSI report) in a wireless communication system.

In addition, an additional technical object of the present disclosure is to provide a method and apparatus for for calculating and reporting CSI by performing measurement on a CSI reference resource in multiple time instances in a wireless communication system.

The technical objects to be achieved by the present disclosure are not limited to the above-described technical objects, and other technical objects which are not described herein will be clearly understood by those skilled in the pertinent art from the following description.

A method performed by a terminal in a wireless communication system according to an aspect of the present disclosure may comprise: receiving, from a network, configuration information related to N reporting settings and a plurality of channel state information-reference signal (CSI-RS) resources, wherein the N is an integer greater than or equal to 1; receiving, from the network, triggering information indicating at least one reporting setting among the N reporting settings; and transmitting, to the network, a single CSI based on a plurality of time instances of the plurality of CSI-RS resources, in response to the triggering information. Here, the plurality of time instances may be related to the at least one reporting setting.

A method performed by a base station in a wireless communication system according to an additional aspect of the present disclosure may comprise: transmitting, to a terminal, configuration information related to N reporting settings and a plurality of channel state information-reference signal (CSI-RS) resources, wherein the N is an integer greater than or equal to 1; transmitting, to the terminal, triggering information indicating at least one reporting setting among the N reporting settings; and receiving, from the terminal, a single CSI based on a plurality of time instances of the plurality of CSI-RS resources, in response to the triggering information. Here, the plurality of time instances may be related to the at least one reporting setting.

According to an embodiment of the present disclosure, a method and apparatus for performing channel state information report (CSI report) in a wireless communication system may be provided.

According to an embodiment of the present disclosure, a method and apparatus for calculating and reporting CSI by performing measurement on a CSI reference resource in multiple time instances in a wireless communication system may be provided.

According to an embodiment of the present disclosure, a CSI reference signal (CSI-RS) may be configured in a burst form for multiple time instances.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

FIG. 6 illustrates physical channels used in a wireless communication system to which the present disclosure may be applied and a general signal transmission and reception method using them.

FIG. 9 is a diagram which illustrates a block diagram of a wireless communication device according to an embodiment of the present disclosure.

DETAILED DESCRIPTION

Figure 1:
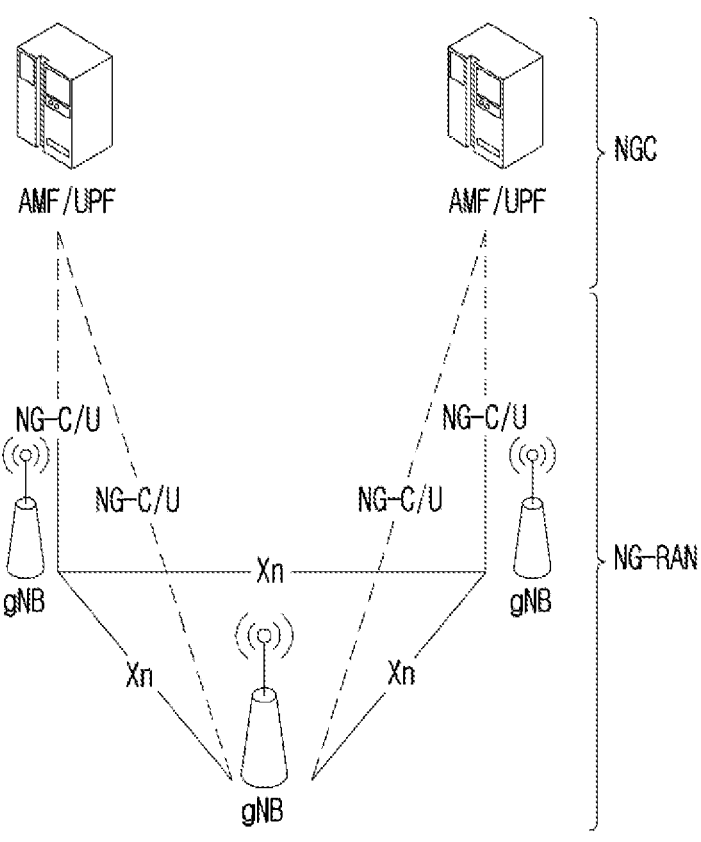
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone(UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone(UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11(Wi-Fi), IEEE 802.16(WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR (New Radio or New Radio Access Technology) is an advanced version of 3GPP LTE/LTE-A/ LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211(physical channels and modulation), TS 36.212(multiplexing and channel coding), TS 36.213(physical layer procedures), TS 36.300(overall description), TS 36.331(radio resource control) may be referred to.

For 3GPP NR, TS 38.211(physical channels and modulation), TS 38.212(multiplexing and channel coding), TS 38.213(physical layer procedures for control), TS 38.214 (physical layer procedures for data), TS 38.300(NR and NG-RAN (New Generation-Radio Access Network) overall description), TS 38.331(radio resource control protocol specification) may be referred to.

Abbreviations of terms which may be used in the present disclosure is defined as follows.

BM: beam management

CQI: Channel Quality Indicator

CRI: channel state information—reference signal resource indicator

CSI: channel state information

CSI-IM: channel state information—interference measurement

CSI-RS: channel state information—reference signal

DMRS: demodulation reference signal

FDM: frequency division multiplexing

FFT: fast Fourier transform

IFDMA: interleaved frequency division multiple access

IFFT: inverse fast Fourier transform

L1-RSRP: Layer 1 reference signal received power

L1-RSRQ: Layer 1 reference signal received quality

MAC: medium access control

NZP: non-zero power

OFDM: orthogonal frequency division multiplexing

PDCCH: physical downlink control channel

PDSCH: physical downlink shared channel

PMI: precoding matrix indicator

RE: resource element

RI: Rank indicator

RRC: radio resource control

RSSI: received signal strength indicator

Rx: Reception

QCL: quasi co-location

SINR: signal to interference and noise ratio

SSB (or SS/PBCH block): Synchronization signal block (including PSS (primary synchronization signal), SSS (secondary synchronization signal) and PBCH (physical broadcast channel))

TDM: time division multiplexing

TRP: transmission and reception point

TRS: tracking reference signal

Tx: transmission

UE: user equipment

ZP: zero power

Overall System

As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
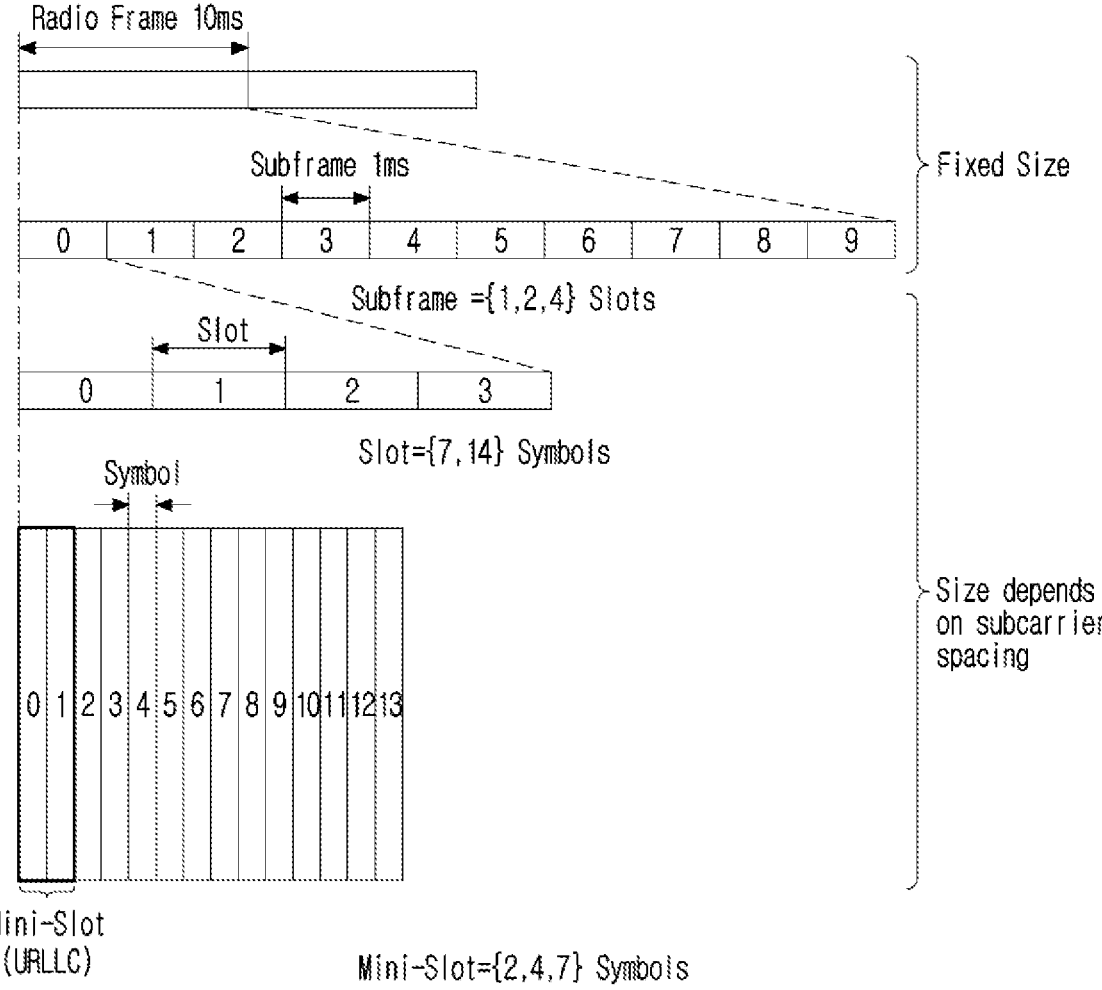
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, $\mu$). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| $\mu$ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max}\cdot N_f)$. Here, $\Delta f_{max}$ is $480\cdot10^3$ Hz and $N_f$ is 4096. Downlink and uplink transmission is configured (organized) with a radio frame having a duration of $T_f=1/(\Delta f_{max}N_f/100)\cdot T_c=10$ ms. Here, a radio frame is configured with 10 subframes having a duration of $T_{sf}=(\Delta f_{max}N_f/1000)\cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration μ, slots are numbered in an increasing order of $n_s^\mu \in \{0, \ldots, N_{slot}^{subframe,\mu}-1\}$ in a subframe and are numbered in an increasing order of $n_s^\mu \in \{0, \ldots, N_{slot}^{subframe,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\,\mu}$ | $N_{slot}^{subframe,\,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\,\mu}$ | $N_{slot}^{subframe,\,\mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1, 2, 4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
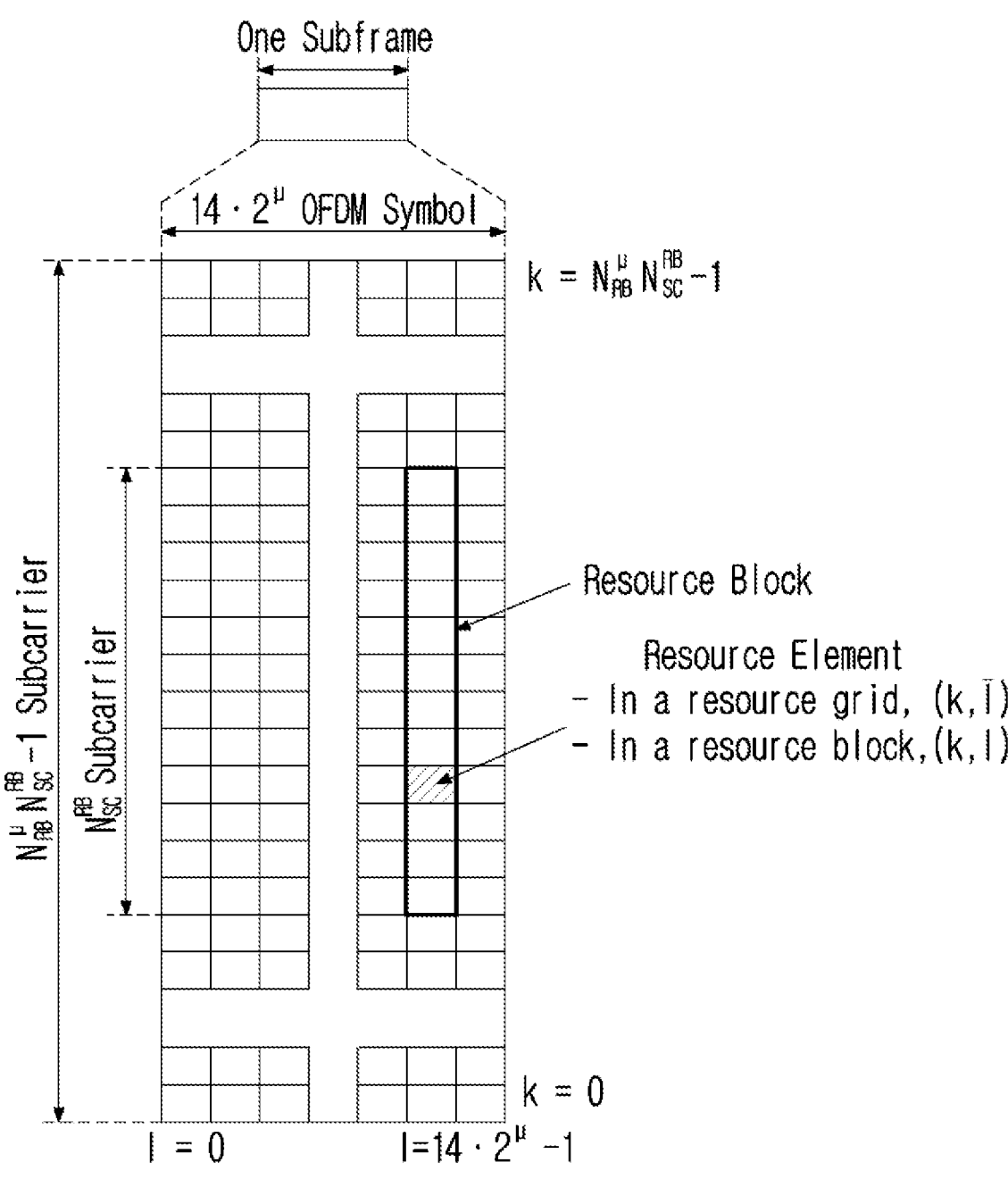
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^\mu N_{sc}^{RB}$ subcarriers in a frequency domain and one subframe is configured with $14\cdot2^\mu$ OFDM symbols, but it is not limited thereto. In an NR system, a transmitted signal is described by OFDM symbols of $2^{\mu N}{}_{symb}{}^{(\mu)}$ and one or more resource grids configured with $N_{RB}^\mu N_{sc}^{RB}$ subcarriers. Here, $N_{RB}^\mu \le N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, $k=0, \ldots, N_{RB}^\mu N_{sc}^{RB}-1$ is an index in a frequency domain and $l'=0, \ldots, 2^\mu N_{symb}^{(\mu)}-1$ refers to a position of a symbol in a subframe. When referring to a resource element in a slot, an index pair (k,l) is used. Here, $l=0, \ldots, N_{symb}^\mu-1$. A resource element (k,l') for μ and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number number $n_{CRB}^\mu$ and a resource element (k,l) for a subcarrier spacing configuration μ in a frequency domain is given as in the following Equation 1.

$$n_{CRB}^\mu = \left\lfloor \frac{k}{N_{sc}^{RB}} \right\rfloor \qquad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \qquad \text{[Equation 2]}$$

$N_{BWP,i}^{start,\mu}$ is a common resource block that a BWP starts relatively to common resource block 0.

Figure 4:
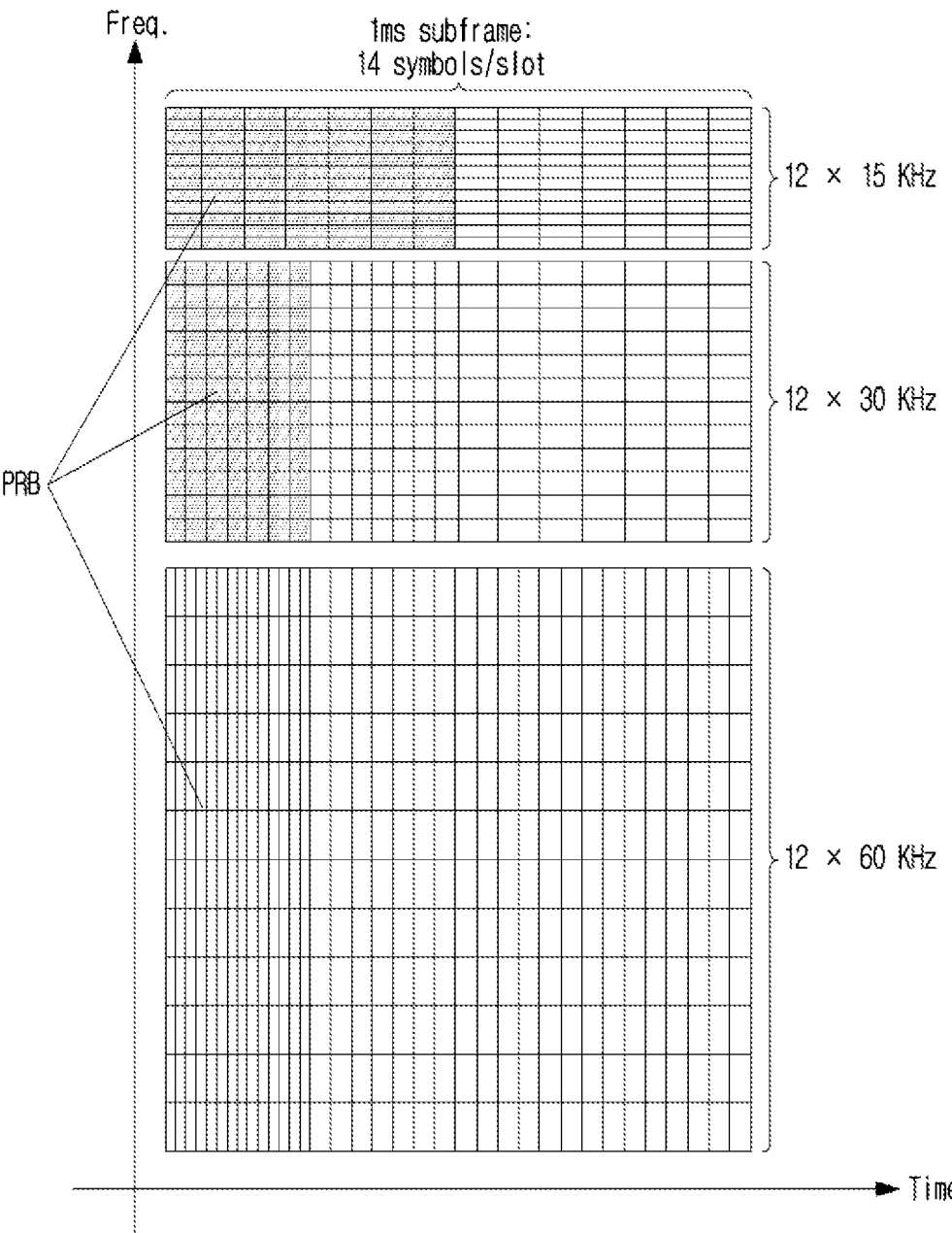
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
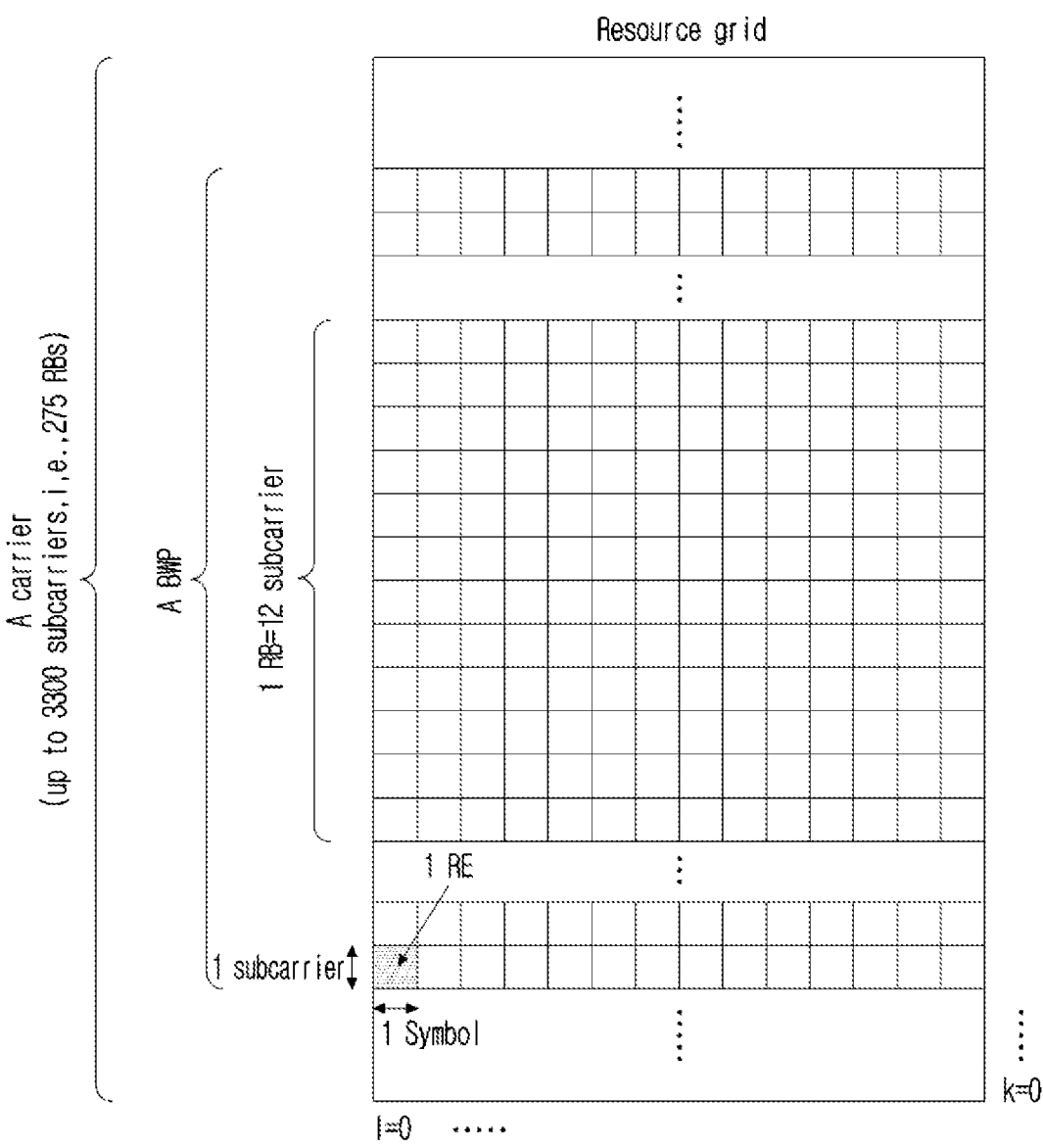
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP (s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

CSI-Related Operation

In an NR (New Radio) system, a CSI-RS (channel state information-reference signal) is used for time and/or frequency tracking, CSI computation, L1 (layer 1)-RSRP (reference signal received power) computation and mobility. Here, CSI computation is related to CSI acquisition and L1-RSRP computation is related to beam management (BM).

CSI (channel state information) collectively refers to information which may represent quality of a radio channel (or also referred to as a link) formed between a terminal and an antenna port.

To perform one of the usages of a CSI-RS, a terminal (e.g., user equipment, UE) receives configuration information related to CSI from a base station (e.g., general Node B, gNB) through RRC (radio resource control) signaling.

The configuration information related to CSI may include at least one of information related to a CSI-IM (interference management) resource, information related to CSI measurement configuration, information related to CSI resource configuration, information related to a CSI-RS resource or information related to CSI report configuration.

i) Information related to a CSI-IM resource may include CSI-IM resource information, CSI-IM resource set information, etc. A CSI-IM resource set is identified by a CSI-IM resource set ID (identifier) and one resource set includes at least one CSI-IM resource. Each CSI-IM resource is identified by a CSI-IM resource ID.

ii) Information related to CSI resource configuration may be expressed as CSI-ResourceConfig IE. Information related to a CSI resource configuration defines a group which includes at least one of an NZP (non zero power) CSI-RS resource set, a CSI-IM resource set or a CSI-SSB resource set. In other words, the information related to a CSI resource configuration may include a CSI-RS resource set list and the CSI-RS resource set list may include at least one of a NZP CSI-RS resource set list, a CSI-IM resource set list or a CSI-SSB resource set list. A CSI-RS resource set is identified by a CSI-RS resource set ID and one resource set includes at least one CSI-RS resource. Each CSI-RS resource is identified by a CSI-RS resource ID.

Parameters representing a usage of a CSI-RS (e.g., a 'repetition' parameter related to BM, a 'trs-Info' parameter related to tracking) may be configured per NZP CSI-RS resource set.

iii) Information related to a CSI report configuration includes a report configuration type (reportConfigType) parameter representing a time domain behavior and a report quantity (reportQuantity) parameter representing CSI-related quantity for a report. The time domain behavior may be periodic, aperiodic or semi-persistent.

A terminal measures CSI based on the configuration information related to CSI.

The CSI measurement may include (1) a process in which a terminal receives a CSI-RS and (2) a process in which CSI is computed through a received CSI-RS and detailed description thereon is described after.

For a CSI-RS, RE (resource element) mapping of a CSI-RS resource in a time and frequency domain is configured by higher layer parameter CSI-RS-ResourceMapping.

A terminal reports the measured CSI to a base station.

In this case, when quantity of CSI-ReportConfig is configured as 'none (or No report)', the terminal may omit the report. But, although the quantity is configured as 'none (or No report)', the terminal may perform a report to a base station. When the quantity is configured as 'none', an aperiodic TRS is triggered or repetition is configured. In this case, only when repetition is configured as 'ON', a report of the terminal may be omitted.

CSI Measurement

An NR system supports more flexible and dynamic CSI measurement and reporting. Here, the CSI measurement may include a procedure of receiving a CSI-RS and acquiring CSI by computing a received CSI-RS.

As a time domain behavior of CSI measurement and reporting, aperiodic/semi-persistent/periodic CM (channel measurement) and IM (interference measurement) are supported. 4-port NZP CSI-RS RE pattern is used for CSI-IM configuration.

CSI-IM based IMR of NR has a design similar to CSI-IM of LTE and is configured independently from ZP CSI-RS resources for PDSCH rate matching. In addition, each port emulates an interference layer having (a desirable channel and) a precoded NZP CSI-RS in NZP CSI-RS-based IMR. As it is about intra-cell interference measurement for a multi-user case, MU interference is mainly targeted.

A base station transmits a precoded NZP CSI-RS to a terminal in each port of configured NZP CSI-RS based IMR.

A terminal assumes a channel/interference layer and measures interference for each port in a resource set.

When there is no PMI and RI feedback for a channel, a plurality of resources are configured in a set and a base station or a network indicates a subset of NZP CSI-RS resources through DCI for channel/interference measurement.

A resource setting and a resource setting configuration are described in more detail.

Resource Setting

Each CSI resource setting 'CSI-ResourceConfig' includes a configuration for a S≥1 CSI resource set (given by a higher layer parameter csi-RS-ResourceSetList). A CSI resource setting corresponds to CSI-RS-resourcesetlist. Here, S represents the number of configured CSI-RS resource sets. Here, a configuration for a S≥1 CSI resource set includes each CSI resource set including CSI-RS resources (configured with a NZP CSI-RS or CSI-IM) and a SS/PBCH block (SSB) resource used for L1-RSRP computation.

Each CSI resource setting is positioned at a DL BWP (bandwidth part) identified by a higher layer parameter bwp-id. In addition, all CSI resource settings linked to a CSI reporting setting have the same DL BWP.

A time domain behavior of a CSI-RS resource in a CSI resource setting included in a CSI-ResourceConfig IE may be indicated by a higher layer parameter resourceType and may be configured to be aperiodic, periodic or semi-persistent. For a periodic and semi-persistent CSI resource setting, the number (S) of configured CSI-RS resource sets is limited to '1'. For a periodic and semi-persistent CSI resource setting, configured periodicity and a slot offset are given by a numerology of an associated DL BWP as given by bwp-id.

When UE is configured with a plurality of CSI-ResourceConfigs including the same NZP CSI-RS resource ID, the same time domain behavior is configured for CSI-ResourceConfig.

When UE is configured with a plurality of CSI-ResourceConfigs including the same CSI-IM resource ID, the same time domain behavior is configured for CSI-ResourceConfig.

One or more CSI resource settings for channel measurement (CM) and interference measurement (IM) are configured through higher layer signaling as follows.

CSI-IM resource for interference measurement

NZP CSI-RS resource for interference measurement

NZP CSI-RS resource for channel measurement

In other words, a CMR (channel measurement resource) may be a NZP CSI-RS for CSI acquisition and an IMR (Interference measurement resource) may be a NZP CSI-RS for CSI-IM and IM.

In this case, CSI-IM (or a ZP CSI-RS for IM) is mainly used for inter-cell interference measurement.

In addition, an NZP CSI-RS for IM is mainly used for intra-cell interference measurement from multi-users.

UE may assume that CSI-RS resource (s) for channel measurement and CSI-IM/NZP CSI-RS resource (s) for interference measurement configured for one CSI reporting are 'QCL-TypeD' per resource.

Resource Setting Configuration

As described, a resource setting may mean a resource set list.

For aperiodic CSI, each trigger state configured by using a higher layer parameter CSI-AperiodicTriggerState is associated with one or a plurality of CSI-ReportConfigs that each CSI-ReportConfig is linked to a periodic, semi-persistent or aperiodic resource setting.

One reporting setting may be connected to up to 3 resource settings.

When one resource setting is configured, a resource setting (given by a higher layer parameter resourcesForChannelMeasurement) is about channel measurement for L1-RSRP computation.

When two resource settings are configured, a first resource setting (given by a higher layer parameter resourcesForChannelMeasurement) is for channel measurement and a second resource setting (given by csi-IM-ResourcesForInterference or nzp-CSI-RS-ResourcesForInterference) is for interference measurement performed in CSI-IM or a NZP CSI-RS.

When three resource settings are configured, a first resource setting (given by resourcesForChannelMeasurement) is for channel measurement, a second resource setting (given by csi-IM-ResourcesForInterference) is for CSI-IM based interference measurement and a third resource setting (given by nzp-CSI-RS-ResourcesForInterference) is for NZP CSI-RS based interference measurement.

For semi-persistent or periodic CSI, each CSI-ReportConfig is linked to a periodic or semi-persistent resource setting.

When one resource setting (given by resourcesForChannelMeasurement) is configured, the resource setting is about channel measurement for L1-RSRP computation.

When two resource settings are configured, a first resource setting (given by resourcesForChannelMeasurement) is for channel measurement and a second resource setting (given by a higher layer parameter csi-IM-ResourcesForInterference) is used for interference measurement performed in CSI-IM.

CSI Computation

When interference measurement is performed in CSI-IM, each CSI-RS resource for channel measurement is associated with a CSI-IM resource per resource in an order of CSI-RS resources and CSI-IM resources in a corresponding resource set. The number of CSI-RS resources for channel measurement is the same as the number of CSI-IM resources.

In addition, when interference measurement is performed in an NZP CSI-RS, UE does not expect to be configured with one or more NZP CSI-RS resources in an associated resource set in a resource setting for channel measurement.

A terminal configured with a higher layer parameter nzp-CSI-RS-ResourcesForInterference does not expect that 18 or more NZP CSI-RS ports will be configured in a NZP CSI-RS resource set.

For CSI measurement, a terminal assumes the followings.

Each NZP CSI-RS port configured for interference measurement corresponds to an interference transmission layer.

All interference transmission layers of an NZP CSI-RS port for interference measurement consider EPRE (energy per resource element) ratio.

A different interference signal in RE(s) of an NZP CSI-RS resource for channel measurement, an NZP CSI-RS resource for interference measurement or a CSI-IM resource for interference measurement

CSI Report

For a CSI report, a time and frequency resource which may be used by UE are controlled by a base station.

CSI (channel state information) may include at least one of a channel quality indicator (CQI), a precoding matrix indicator (PMI), a CSI-RS resource indicator (CRI), a SS/PBCH block resource indicator (SSBRI), a layer indicator (LI), a rank indicator (RI) or L1-RSRP.

For CQI, PMI, CRI, SSBRI, LI, RI, L1-RSRP, a terminal is configured by a higher layer with $N \geq 1$ CSI-ReportConfig reporting setting, $M \geq 1$ CSI-ResourceConfig resource setting and a list of one or two trigger states (provided by aperiodicTriggerStateList and semiPersistentOnPUSCH-TriggerStateList). Each trigger state in the aperiodicTriggerStateList includes a associated CSI-ReportConfigs list which indicates a channel and optional resource set IDs for interference. In semiPersistentOnPUSCH-TriggerStateList, one associated CSI-ReportConfig is included in each trigger state.

In addition, a time domain behavior of CSI reporting supports periodic, semi-persistent, aperiodic.

i) Periodic CSI reporting is performed in a short PUCCH, a long PUCCH. Periodicity and a slot offset of periodic CSI reporting may be configured by RRC and refers to a CSI-ReportConfig IE.

ii) SP (semi-periodic) CSI reporting is performed in a short PUCCH, a long PUCCH, or a PUSCH.

For SP CSI in a short/long PUCCH, periodicity and a slot offset are configured by RRC and a CSI report is activated/deactivated by separate MAC CE/DCI.

For SP CSI in a PUSCH, periodicity of SP CSI reporting is configured by RRC, but a slot offset is not configured by RRC and SP CSI reporting is activated/deactivated by DCI (format 0_1). For SP CSI reporting in a PUSCH, a separated RNTI (SP-CSI C-RNTI) is used.

An initial CSI report timing follows a PUSCH time domain allocation value indicated by DCI and a subsequent CSI report timing follows a periodicity configured by RRC.

DCI format 0_1 may include a CSI request field and activate/deactivate a specific configured SP-CSI trigger state. SP CSI reporting has activation/deactivation equal or similar to a mechanism having data transmission in a SPS PUSCH.

iii) Aperiodic CSI reporting is performed in a PUSCH and is triggered by DCI. In this case, information related to trigger of aperiodic CSI reporting may be delivered/indicated/configured through MAC-CE.

For AP CSI having an AP CSI-RS, AP CSI-RS timing is configured by RRC and timing for AP CSI reporting is dynamically controlled by DCI.

In NR, a method of dividing and reporting CSI in a plurality of reporting instances applied to a PUCCH based CSI report in LTE (e.g., transmitted in an order of RI, WB PMI/CQI, SB PMI/CQI) is not applied. Instead, in NR, there is a limit that a specific CSI report is not configured in a short/long PUCCH and a CSI omission rule is defined. In addition, regarding AP CSI reporting timing, a PUSCH symbol/slot location is dynamically indicated by DCI. In addition, candidate slot offsets are configured by RRC. For CSI reporting, a slot offset (Y) is configured per reporting setting. For UL-SCH, a slot offset K2 is separately configured.

2 CSI latency classes (low latency class, high latency class) are defined with regard to CSI computation complexity. Low latency CSI is WB CSI which includes up to 4 ports Type-I codebooks or up to 4 ports non-PMI feedback CSI. High latency CSI refers to CSI other than low latency CSI. For a normal terminal, (Z, Z') is defined in a unit of OFDM symbols. Here, Z represents the minimum CSI processing time until a CSI report is performed after receiving aperiodic CSI triggering DCI. In addition, Z' refers to the minimum CSI processing time until a CSI report is performed after receiving a CSI-RS for a channel/interference.

Additionally, a terminal reports the number of CSI which may be calculated at the same time.

Method for Calculating/Reporting CSI (Channel State Information) Based on Multiple Time Instances A CSI reporting method may be enhanced for a high/medium speed UE.

In this regard, a channel measurement resource (CMR)/interference measurement resource (IMR) for multiple time instances may need to be configured. Through this, CSI calculation/reporting using time domain (TD) compression based on multiple time instances may be possible.

In the case of an existing wireless communication system, restrictions on multiple channel/interference measurements in the time domain may be enabled/disabled by the network. Additionally, whether multi-channel measurement is possible may depend on the periodicity of CMR/IMR as well as the above-mentioned measurement restrictions in the time domain.

In the case of aperiodic (AP) CMR/IMR, since there is only one CMR/IMR instance without periodicity, only a single measurement may be possible. That is, in the case of the existing AP CMR/IMR, only a single measurement by a single measurement instance is possible, and in AP CSI reporting, a CSI-RS resource indicator (CRI) corresponding to one specific CSI-RS resource may be reported together.

In the description of the present disclosure, AP CSI reporting may mean CSI reporting in which time domain behavior is configured/set to "aperiodic". In addition, AP CMR/IMR may refer to CMR/IMR configured/associated/connected for AP CSI reporting.

Specifically, an operation in existing AP CSI reporting and AP CMR/IMR configuration may be as follows.

AP CMR/IMR may only be used for AP CSI reporting and may not be used for P/SP CSI reporting.

AP CSI reporting (e.g., CSI-ReportConfig configured to AP) may be triggered through a CSI request field in the UL DCI. A codepoint value of the corresponding CSI request field is set through a specific RRC parameter (e.g., aperiodicTriggerStateList), and one or more AP CSI reports may be configured/set for one codepoint.

When one AP CSI report is triggered, the slot location for reporting the corresponding AP CSI report may be determined by a reporting slot offset list (e.g., reportSlotOffsetList) in the corresponding CSI reporting setting (e.g., CSI-ReportConfig IE). Candidate reporting slot values defined in the reporting slot offset list may be sequentially overridden to/by codepoints of a time domain resource assignment (TDRA) field in the UL DCI. Accordingly, the reporting slot location for the AP CSI reporting may be indicated as one value in the reporting slot offset list through the TRDA field. On the other hand, when multiple AP CSI reports are triggered, the terminal may report the multiple AP CSI reportings at once. In this case, the reporting slot location may be determined/used as a maximum value among reporting locations for each AP CSI report.

A slot location of AP CMR/IMR used in each AP CSI report may be determined by an aperiodic triggering offset (e.g., aperiodicTriggeringOffset). Here, the aperiodic triggering offset is configured/set through resource set information (e.g., NZP-CSI-RS-ResourceSet) for resource set list information (e.g., nzp-CSI-RS-ResourceSetList) in a resource configuration (e.g., CSI-ResourceConfig IE) associated with the corresponding reporting setting (e.g., CSI-ReportConfig IE) of the AP CSI report. Additionally, the symbol position of the AP CMR/IMR may be determined as the symbol position of the CSI-RS resource configured to the AP CMR/IMR.

Multiple AP CMR/IMR may be configured for each AP CSI report. In this case, the terminal may select AP CMR/IMR through CSI-RS resource indicator (CRI), calculate CSI (e.g. RI/PMI/CQI) for the selected AP CMR/IMR, and report the calculated CSI.

Considering the above-mentioned description, in the present disclosure, unlike the existing AP CSI reporting method, a method for configuring/providing/securing multiple measurement time instances for AP CMR/IMR, and thus reporting a single CSI will be proposed.

In other words, a method for performing CSI reporting by compressing CSI for multiple time instances (i.e., considers/assumes CMR/IMR for multiple time instances as one/same CMR/IMR) by the terminal.

Figure 7:
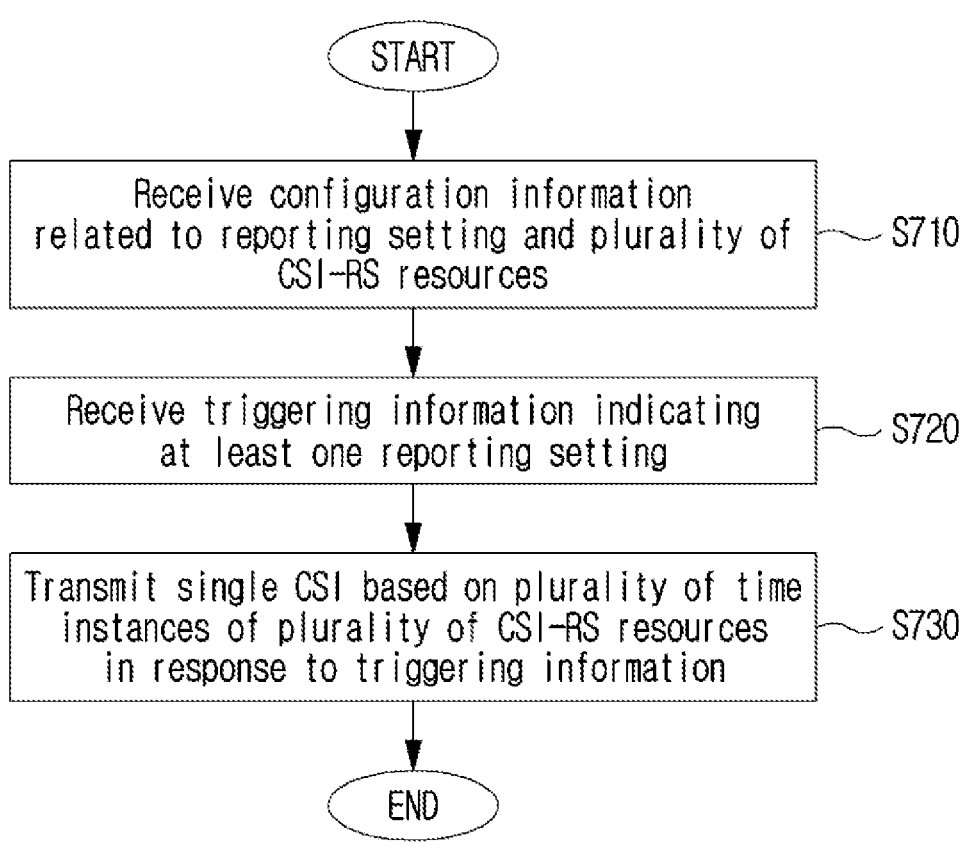
FIG. 7 is a diagram for explaining an example of a method for transmitting channel state information of a terminal according to the present disclosure.
Figure 8:
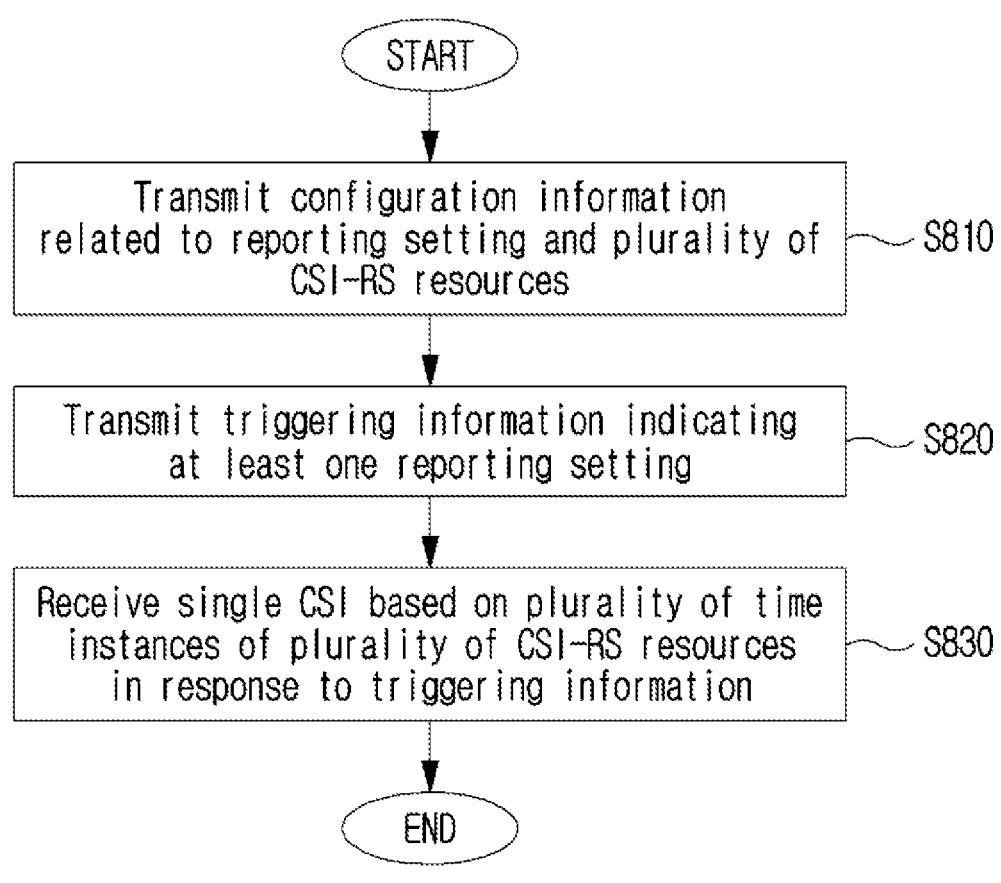
FIG. 8 is a diagram for explaining an example of a method for receiving channel state information of a base station according to the present disclosure.

FIG. 7 is a diagram for explaining an example of a method for transmitting channel state information of a terminal according to the present disclosure.

In step S710, the terminal may receive configuration information related to N reporting settings and a plurality of channel state information-reference signal (CSI-RS) resources. Here, the N is an integer greater than or equal to 1.

For example, the reporting setting corresponds to reporting configuration related to CSI reporting (e.g., CSI-ReportConfig), and the plurality of CSI-RS resources may correspond to multiple CMR/IMR for channel/interference measurement.

In step S720, the terminal may receive triggering information indicating at least one reporting setting among the N reporting settings.

For example, the terminal may receive information for triggering some of reporting settings configured/provided through a higher layer, through DCI.

In step S730, the terminal may transmit a single CSI based on a plurality of time instances of the plurality of CSI-RS resources, in response to the triggering information. Here, the plurality of time instances may be related to the at least one reporting setting.

For example, the at least one reporting setting may be configured not to include a CSI-RS resource indicator (CRI) as report information (e.g., report quantity) reported by the terminal.

For example, when one reporting setting is triggered by the triggering information, the plurality of CSI-RS resources may be configured through one resource set associated with the one reporting setting. In this regard, a configuration for the one resource set may include information on a plurality of triggering offsets related/corresponded to the plurality of CSI-RS resources.

For example, when one reporting setting is triggered by the triggering information, the plurality of CSI-RS resources may be configured through a plurality of resource sets associated with the one reporting setting. In this regard, a configuration for each of the plurality of resource sets may include information on one triggering offset, and a plurality of triggering offsets configured through the plurality of resource sets may be related/corresponded to the plurality of CSI-RS resources.

For example, when a plurality of reporting settings are triggered by the triggering information, the plurality of CSI-RS resources may be configured through the plurality of reporting setting. Here, each of the plurality of reporting settings may include one or more CSI-RS resources.

For example, the single CSI may be calculated by considering the multiple CSI-RS resources as the same resource in the plurality of time instances. Additionally or alternatively, information on whether the terminal performs calculation of the single CSI based on the plurality of time instances may be indicated by the network/base station.

For example, the plurality of time instances may be configured using a plurality of triggering offsets related to the at least one reporting setting based on a timing of the triggering information. Additionally or alternatively, the plurality of time instances may be configured in units of transmission time intervals (TTIs) (e.g., slot) for the wireless communication system.

FIG. 7 is a diagram for explaining an example of a method for receiving channel state information of a base station according to the present disclosure.

In step S810, the base station may transmit configuration information related to N reporting settings and a plurality of channel state information-reference signal (CSI-RS) resources. Here, the N is an integer greater than or equal to 1.

For example, the reporting setting corresponds to reporting configuration related to CSI reporting (e.g., CSI-ReportConfig), and the plurality of CSI-RS resources may correspond to multiple CMR/IMR for channel/interference measurement.

In step S820, the base station may transmit triggering information indicating at least one reporting setting among the N reporting settings.

For example, the base station may transmit information for triggering some of reporting settings configured/provided through a higher layer, through DCI.

In step S830, the base station may receive a single CSI based on a plurality of time instances of the plurality of CSI-RS resources, in response to the triggering information. Here, the plurality of time instances may be related to the at least one reporting setting.

For example, the at least one reporting setting may be configured not to include a CSI-RS resource indicator (CRI) as report information (e.g., report quantity) reported by the terminal.

For example, when one reporting setting is triggered by the triggering information, the plurality of CSI-RS resources may be configured through one resource set associated with the one reporting setting. In this regard, a configuration for the one resource set may include information on a plurality of triggering offsets related/corresponded to the plurality of CSI-RS resources.

For example, when one reporting setting is triggered by the triggering information, the plurality of CSI-RS resources may be configured through a plurality of resource sets associated with the one reporting setting. In this regard, a configuration for each of the plurality of resource sets may include information on one triggering offset, and a plurality of triggering offsets configured through the plurality of resource sets may be related/corresponded to the plurality of CSI-RS resources.

For example, when a plurality of reporting settings are triggered by the triggering information, the plurality of CSI-RS resources may be configured through the plurality of reporting setting. Here, each of the plurality of reporting settings may include one or more CSI-RS resources.

For example, the single CSI may be calculated by considering the multiple CSI-RS resources as the same resource in the plurality of time instances. Additionally or alternatively, information on whether the terminal performs calculation of the single CSI based on the plurality of time instances may be indicated by the network/base station.

For example, the plurality of time instances may be configured using a plurality of triggering offsets related to the at least one reporting setting based on a timing of the triggering information. Additionally or alternatively, the plurality of time instances may be configured in units of transmission time intervals (TTIs) (e.g., slot) for the wireless communication system.

Hereinafter, the present disclosure describes a specific method for configuring/providing/securing multiple time instances for channel/interference measurement in relation to CSI calculation/transmission through various embodiments.

The embodiments described below are differentiated for clarity of explanation, and each embodiment may be applied independently, or a part/all configuration of one embodiment may be applied in combination/combination/replacement with some entire configurations of another embodiment.

Embodiment 1

A method of configuring multiple AP CMRs/IMRs for AP CSI reporting, but not configuring/reporting a CSI-RS resource indicator (CRI) as reporting information (e.g., report quantity) is proposed.

That is, a plurality of CSI-RS/CSI-IM resources for AP CMR/IMR usage associated with AP CSI reporting are configured, and CRI is not included in the report setting for the corresponding AP CSI reporting includes as information reported by the terminal.

In this case, the terminal/base station may assume/consider/regard that the plurality of AP CMRs/IMRs are configured over a plurality of time instances by one same resource rather than by different resources.

For example, when three 4-port CSI-RS resources (i.e., a first CSI-RS resource, a second CSI-RS resource, and a third CSI-RS resource) are configured as the AP CMR, the terminal/base station may interpret corresponding CSI-RS resources as the same resource, and interpret the i-th port of each resource as the same port. That is, the the terminal/base station may assume that the i-th port (port i) of the first CSI-RS resource, the i-th port of the second CSI-RS resource and the i-th port of the third CSI-RS resource are the same port (shown/existing at different time instances).

Similarly, multiple AP IMRs may also be interpreted as the same resource. For example, when the AP IMR is configured to a non zero power (NZP) CSI-RS resource, the terminal/base station may interpret the i-th port of the plurality of NZP CSI-RS resources as the same port. Since the port is not defined when the AP IMR is configured as a zero power (ZP) CSI-RS resource, the terminal/base station may assume the corresponding ZP CSI-RS resource as the same IMR resource defined at different time instances.

In the case of the existing AP CSI reporting method, a plurality of AP CMRs configured for AP CSI reporting may be configured in one resource set (e.g., NZP-CSI-RS-ResourceSet) among resource set list information (e.g., nzp-CSI-RS-ResourceSetList). That is, the plurality of AP CMR may be configured based on one of one or more resource sets included in resource set list information (e.g., nzp-CSI-RS-ResourceSetList) in a resource setting (e.g., CSI-ResourceConfig IE) associated with a corresponding reporting setting (e.g., CSI-ReportConfig IE).

At this time, the slot location of the AP CMR/IMR is determined as one aperiodic triggering offset (e.g., aperiodic TriggeringOffset) in a resource set (e.g., NZP-CSI-RS-ResourceSet). Accordingly, there is a restriction that slot locations of AP CMR/IMR for corresponding AP CSI reporting are configured/set identically.

Therefore, in order to distribute time instances (i.e., measurement time instances) over different slots as proposed in the present disclosure, the afore-mentioned restrictions need to be released.

For this, the present disclosure proposes the following options (i.e., option 1-1 and option 1-2).

Option 1-1

A method of indicating a plurality of aperiodic triggering offsets (e.g., aperiodic TriggeringOffset) in a resource set (e.g., NZP-CSI-RS-ResourceSet) and individually configuring/setting corresponding offset values for each AP CMR/IMR may be applied.

That is, when a plurality of AP CMRs/IMRs are configured, an aperiodic triggering offset may be configured/set/applied to each AP CMR/IMR.

For example, when three AP CMRs/IMRs are configured, three aperiodic triggering offsets [0, 1, 2] are configured/set in a resource set (e.g., NZP-CSI-RS-ResourceSet), and each Aperiodic triggering offset may be applied to each AP CMR/IMR. Through this, each AP CMR/IMR may be configured to a slot through which the DCI triggering the AP CSI report is transmitted (e.g., $X^{th}$ slot), a slot through which the DCI triggering the AP CSI report is transmitted+1 (e.g., $X+1^{th}$ slot), and a slot through which the DCI triggering the AP CSI report is transmitted+2 (e.g., $X+2^{th}$ slot).

Option 1-2

A method of not restricting a plurality of AP CMRs/IMRs configured for AP CSI reporting within one resource set (e.g., NZP-CSI-RS-ResourceSet) may be applied. In this case, the plurality of AP CMRs/IMRs may be configured through a plurality of resource sets (eg, NZP-CSI-RS-ResourceSet) within resource set list information (e.g., nzp-CSI-RS-ResourceSetList).

That is, when the plurality of AP CMR/IMRs are configured, each AP CMR/IMR may be configured through different resource sets (e.g., NZP-CSI-RS-ResourceSet) included in resource set list information (e.g., nzp-CSI-RS-ResourceSetList). In this case, since each resource set includes aperiodic triggering offset information, the aperiodic triggering offset may be individually (/differently) configured/set/applied to each AP CMR/IMR.

For example, when three AP CMR/IMRs are configured, a first AP CMR/IMR may be configured in a first resource set, a second AP CMR/IMR may be configured in a second resource set, and a third AP CMR/IMR may be configured in the third resource set. In this case, aperiodic triggering offsets 0, 1, and 2 may be configured/set in each of the three resource sets. Through this, each AP CMR/IMR may be configured to a slot through which the DCI triggering the AP CSI report is transmitted (e.g., $X^{th}$ slot), a slot through which the DCI triggering the AP CSI report is transmitted+1 (e.g., $X+1^{th}$ slot), and a slot through which the DCI triggering the AP CSI report is transmitted+2 (e.g., $X+2^{th}$ slot).

Embodiment 2

The methods described above in the present disclosure have been described assuming that one AP CSI reporting is triggered through the UL DCI.

On the other hand, a method of simultaneously triggering a plurality of AP CSI reportings may be considered. In this regard, the base station triggers the plurality of AP CSI reportings at the same time, and the terminal/base station may assume/regard all one or more CMRs/IMRs configured in each CSI report as the same resource.

For example, a first CMR/IMR, a second CMR/IMR, and a third CMR/IMR are configured in the first CSI report, the second CSI report, and the third CSI report, respectively, and the first CMR/IMR, the second CMR/IMR and the third CMR/IMR may be configured in the first slot, the second slot, and the third slot, respectively. In this case, in the existing operation, the terminal need to report the first CSI, the second CSI, and the third CSI calculated using the first CMR/IMR, the second CMR/IMR, and the third CMR/IMR, respectively. On the other hand, in the proposed method of the present disclosure, the first CMR, since the second CMR, and the third CMR are all the same resource (i.e., considered/regarded as the same resource), and the first IMR, the second IMR, and the third IMR are all the same resource (i.e., considered/regarded as the same resource), the terminal may calculate/report only one CSI (i.e., a single CSI).

In this regard, the base station may configure/provide information (e.g., indicator) for distinguishing the conventional operation from the proposed operation to the terminal through certain signaling (e.g., RRC message, MAC-CE, DCI, etc.). For example, in the case of DCI, the base station may indicate whether to interpret a multiple trigger CSI report in a conventional manner or like the proposed method of the present disclosure, through a triggering DCI.

Since the above-described proposal of the present disclosure relates to a method of compressing and reporting CSI for multiple time instances at once, in this regard, the terminal may expect that the slot/time at which multiple AP CSI reportings are reported is the same.

In the present disclosure, an aperiodic (AP) CSI reporting has been described as an example for clarity of description, but the scope of the present disclosure is not limited to the example. That is, the proposal of the present disclosure may be extended and applied to periodic (P)/semi-persistent (SP) CSI reporting.

For example, according to the existing operation, multiple P CMR/IMRs may be configured in one P CSI reporting, and in this case, the terminal may report CSI only for the CMR/IMR selected through the CRI. In contrast, if the proposal of the present disclosure is applied, multiple P CMRs/IMRs may be configured for P CSI reporting and CRI may be configured not to be reported. In this case, the terminal assumes that the plurality of P CMRs are the same resource and the plurality of P IMRs are the same resource. Accordingly, there is an effect that the same CMR/IMR appears at intervals smaller than 4 slots, which is the minimum periodicity of the existing P CMR/IMR. That is, according to the proposal of the present disclosure, there is an advantage in that sufficient measurement time instances may be configured/secured without adjusting the minimum periodicity related to P/SP CSI reporting.

According to the above-described proposal of the present disclosure, a method and apparatus for calculating and reporting CSI by performing measurement on CSI reference resources (eg, CMR/IMR) at multiple time instances in a wireless communication system may be provided. In this regard, there is an effect that the CSI-RS may be configured in a burst form for multiple time instances.

General Device to which the Present Disclosure May be Applied

Figure 9:
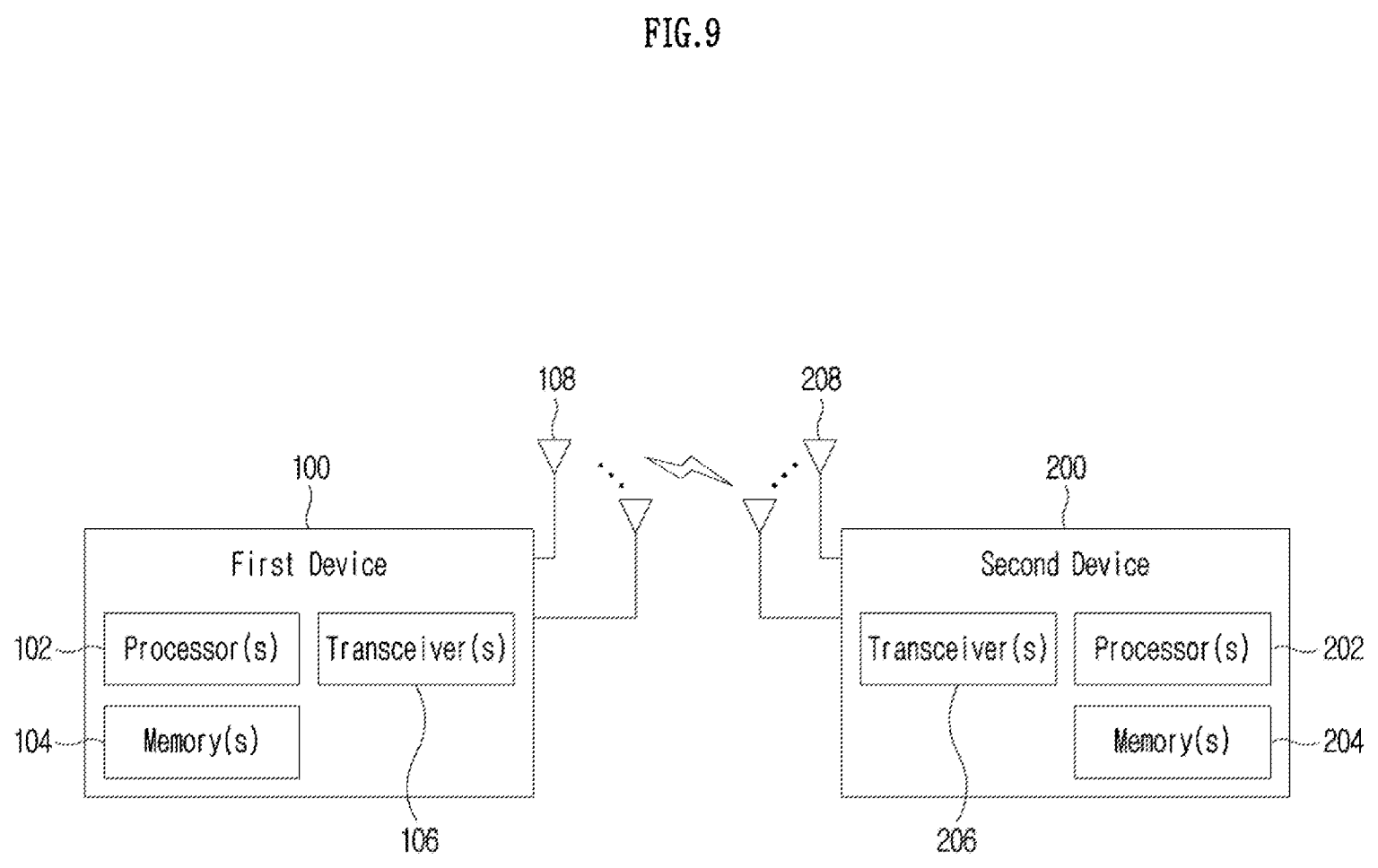

FIG. 9 illustrates a block diagram of a wireless communication device according to an embodiment of the present disclosure.

In reference to FIG. 9, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other nonvolatile solid state storage devices. A memory optionally includes one or more storage devices positioned remotely from processor (s). A memory or alternatively, nonvolatile memory device (s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:

1. A method comprising:
transmitting configuration information related to N reporting settings, wherein the N is an integer greater than or equal to 1;
transmitting triggering information indicating at least one reporting setting among the N reporting settings; and
in response to the triggering information, receiving a single channel station information (CSI) based on a plurality of measurement resources related to the at least one reporting setting,
wherein, based on a CSI reference signal (CSI-RS) resource indicator (CRI) being not configured as report information by the at least one reporting setting, the plurality of measurement resources are interpreted as being configured for one CSI-RS resource over a plurality of time instances, and
wherein the plurality of time instances are configured using a plurality of triggering offsets related to the at least one reporting setting based on a timing of the triggering information.

2. The method of claim 1,
wherein, based on one reporting setting being triggered by the triggering information, the plurality of measurement resources are configured through one resource set associated with the one reporting setting.

3. The method of claim 2,
wherein a configuration for the one resource set includes information for the plurality of triggering offsets.

4. The method of claim 1,
wherein, based on one reporting setting being triggered by the triggering information, the plurality of measurement resources are configured through a plurality of resource sets associated with the one reporting setting.

5. The method of claim 4,
wherein a configuration for each of the plurality of resource sets includes information for one triggering offset.

6. The method of claim 1,
wherein, based on a plurality of reporting settings being triggered by the triggering information, the plurality of measurement resources are configured through the plurality of reporting setting.

7. The method of claim 1,
wherein information for whether a user equipment performs calculation of the single CSI based on the plurality of measurement resources is indicated by a network.

8. The method of claim 1,
wherein the plurality of time instances are configured in units of transmission time intervals.

9. An apparatus comprising:
at least one transceiver; and
at least one processor coupled with the at least one transceiver,
wherein the at least one processor is configured to:
receive configuration information related to N reporting settings, wherein the Nis an integer greater than or equal to 1;
receive triggering information indicating at least one reporting setting among the N reporting settings; and in response to the triggering information, transmit a single channel station information (CSI) based on a plurality of measurement resources,
wherein, based on a CSI reference signal (CSI-RS) resource indicator (CRI) being not configured as report information by the at least one reporting setting, the plurality of measurement resources are interpreted as being configured for one CSI-RS resource over a plurality of time instances, and
wherein the plurality of time instances are configured using a plurality of triggering offsets related to the at least one reporting setting based on a timing of the triggering information.

10. An apparatus comprising:
at least one transceiver; and
at least one processor coupled with the at least one transceiver,
wherein the at least one processor is configured to:
transmit configuration information related to N reporting settings, wherein the Nis an integer greater than or equal to 1;
transmit triggering information indicating at least one reporting setting among the N reporting settings; and
in response to the triggering information, receive a single channel station information (CSI) based on a plurality of measurement resources,
wherein, based on a CSI reference signal (CSI-RS) resource indicator (CRI) being not configured as report information by the at least one reporting setting, the plurality of measurement resources are interpreted as being configured for one CSI-RS resource over a plurality of time instances, and
wherein the plurality of time instances are configured using a plurality of triggering offsets related to the at least one reporting setting based on a timing of the triggering information.

* * * * *